Aug. 30, 1955                A. A. LINSCHEID                2,716,319
                          MOWER ATTACHMENT TO TRACTOR
Filed Nov. 7, 1950                                        7 Sheets-Sheet 1
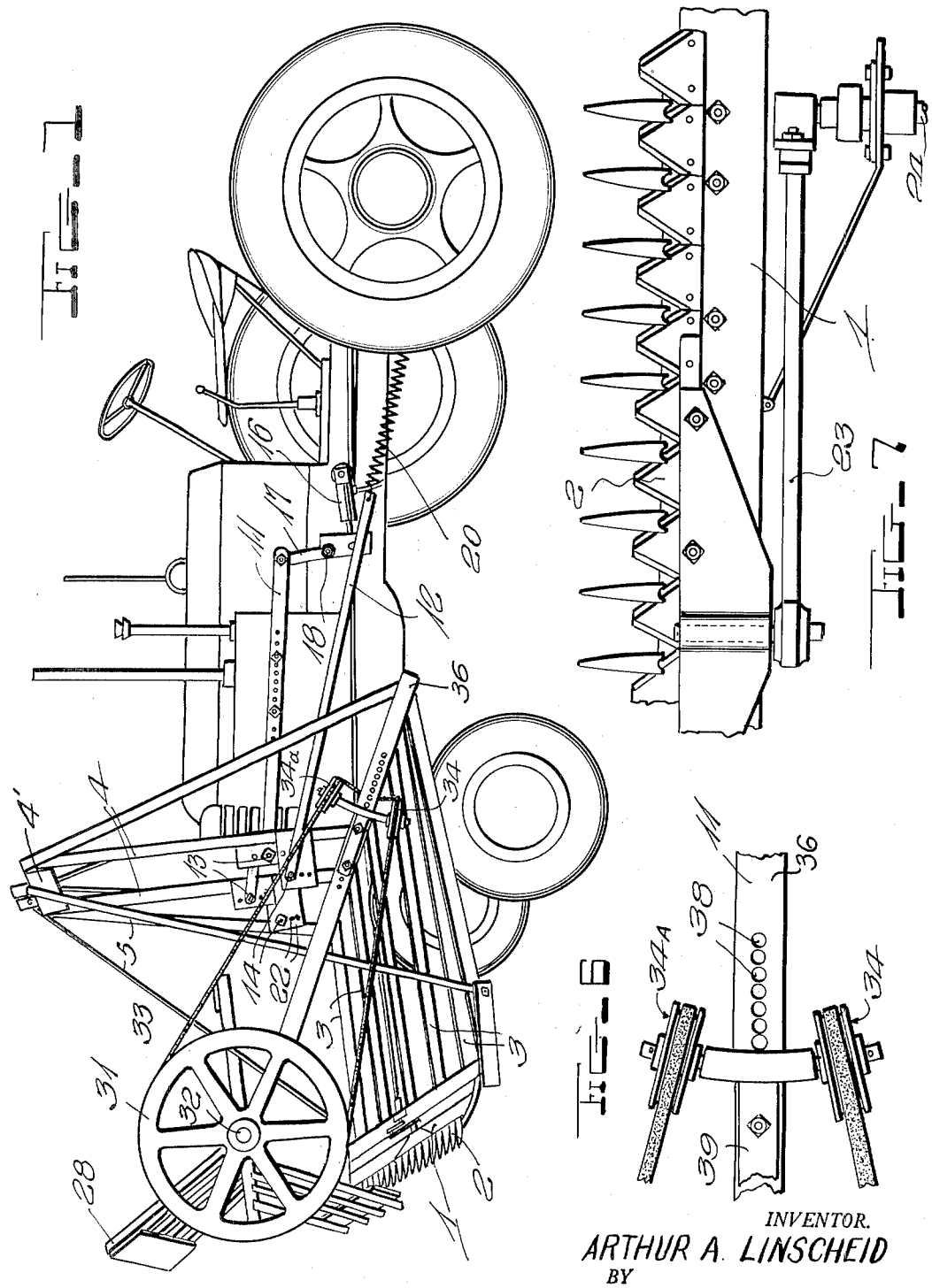
INVENTOR.
ARTHUR A. LINSCHEID
BY
Linton and Linton
ATTORNEYS

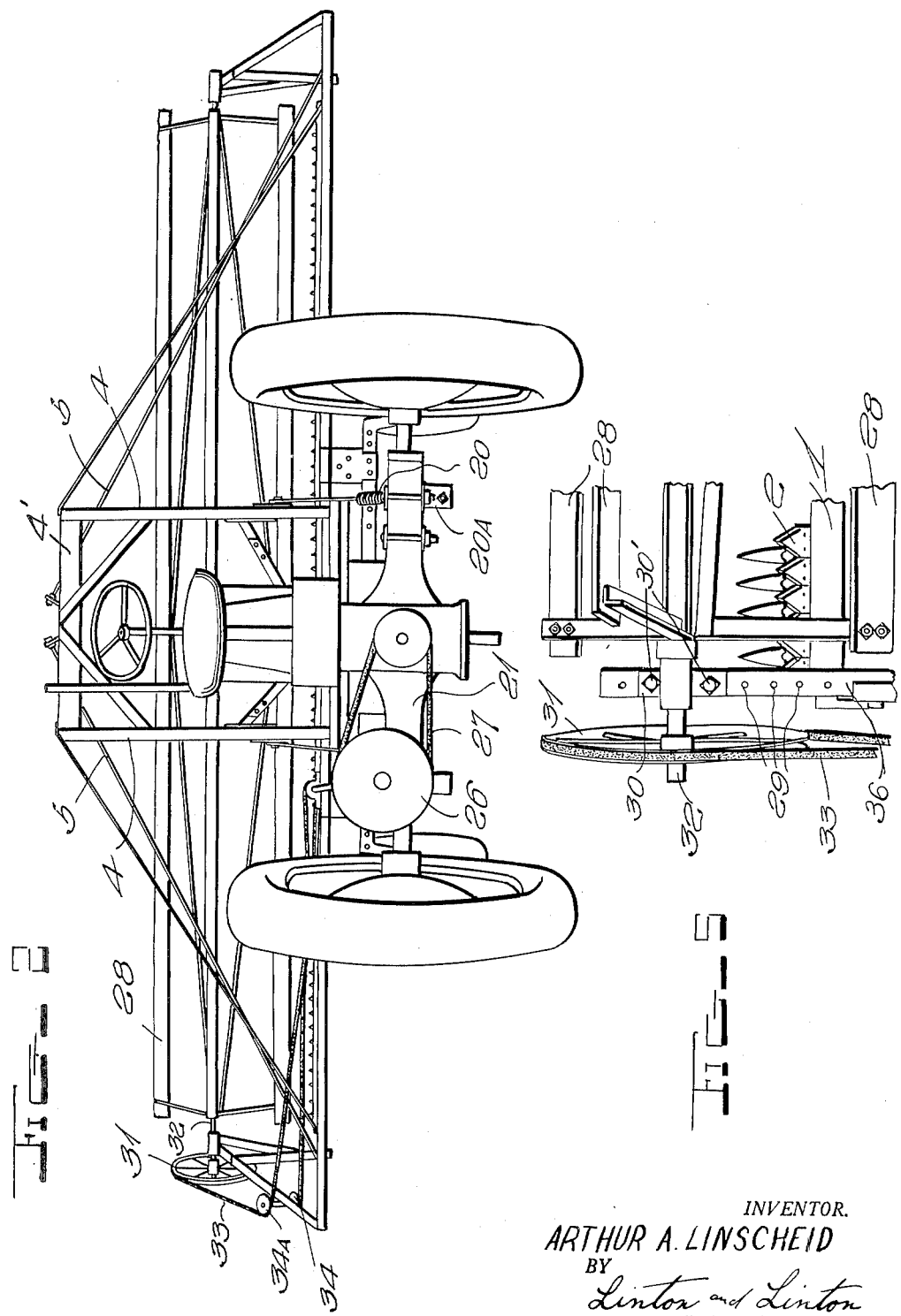

Aug. 30, 1955     A. A. LINSCHEID     2,716,319
MOWER ATTACHMENT TO TRACTOR
Filed Nov. 7, 1950     7 Sheets-Sheet 3
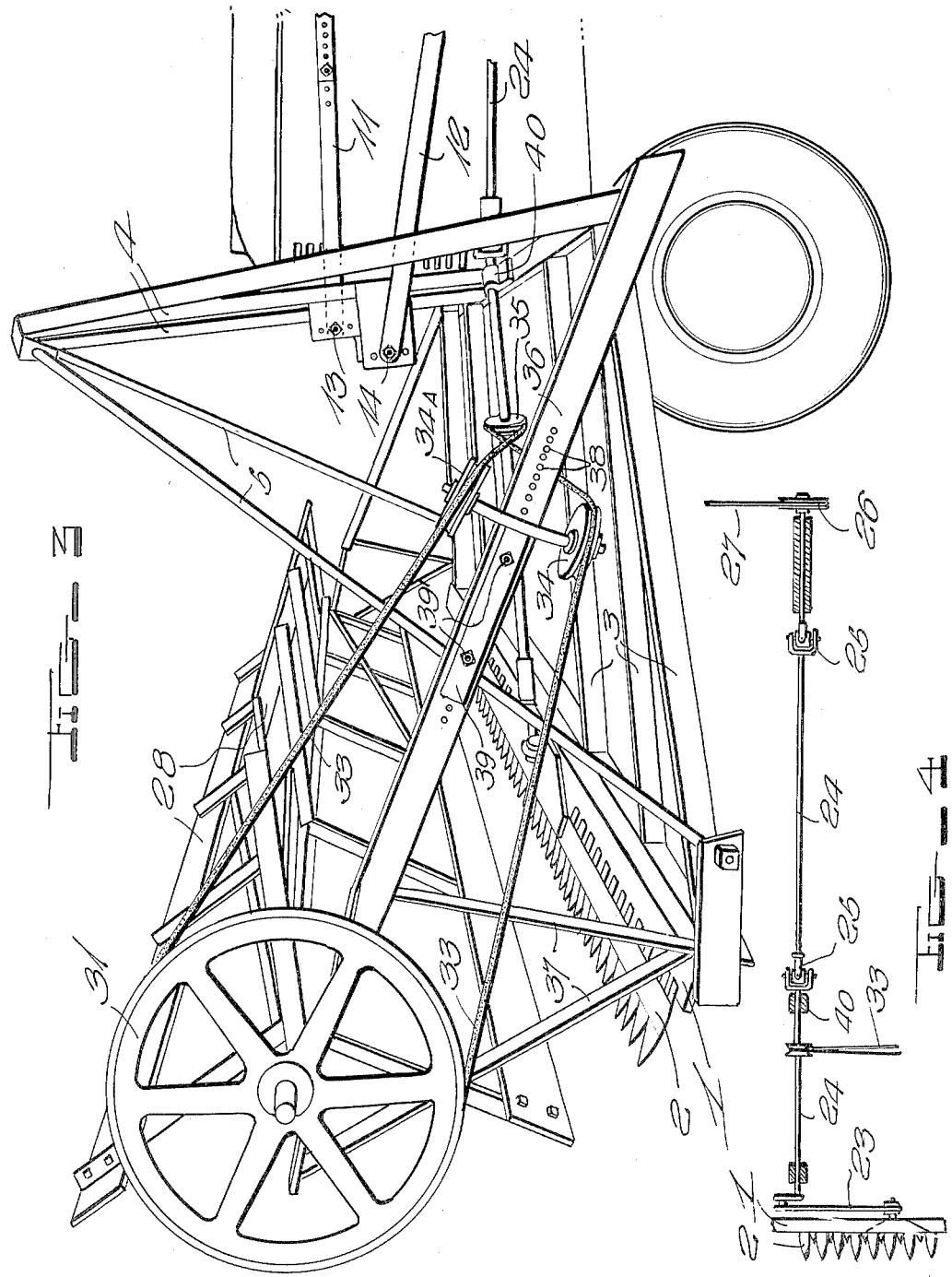
INVENTOR.
ARTHUR A. LINSCHEID
BY
*Linton and Linton*
ATTORNEYS

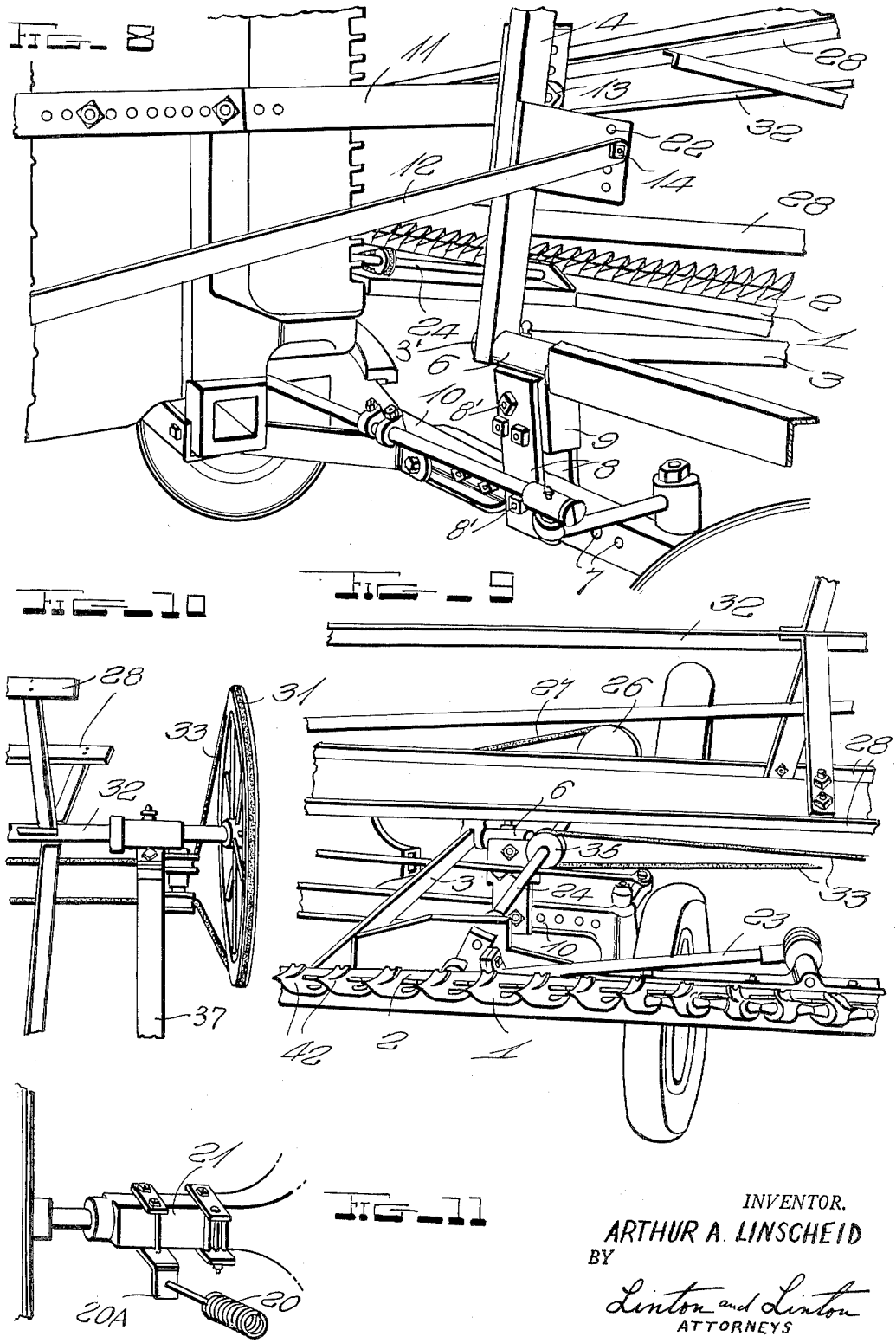

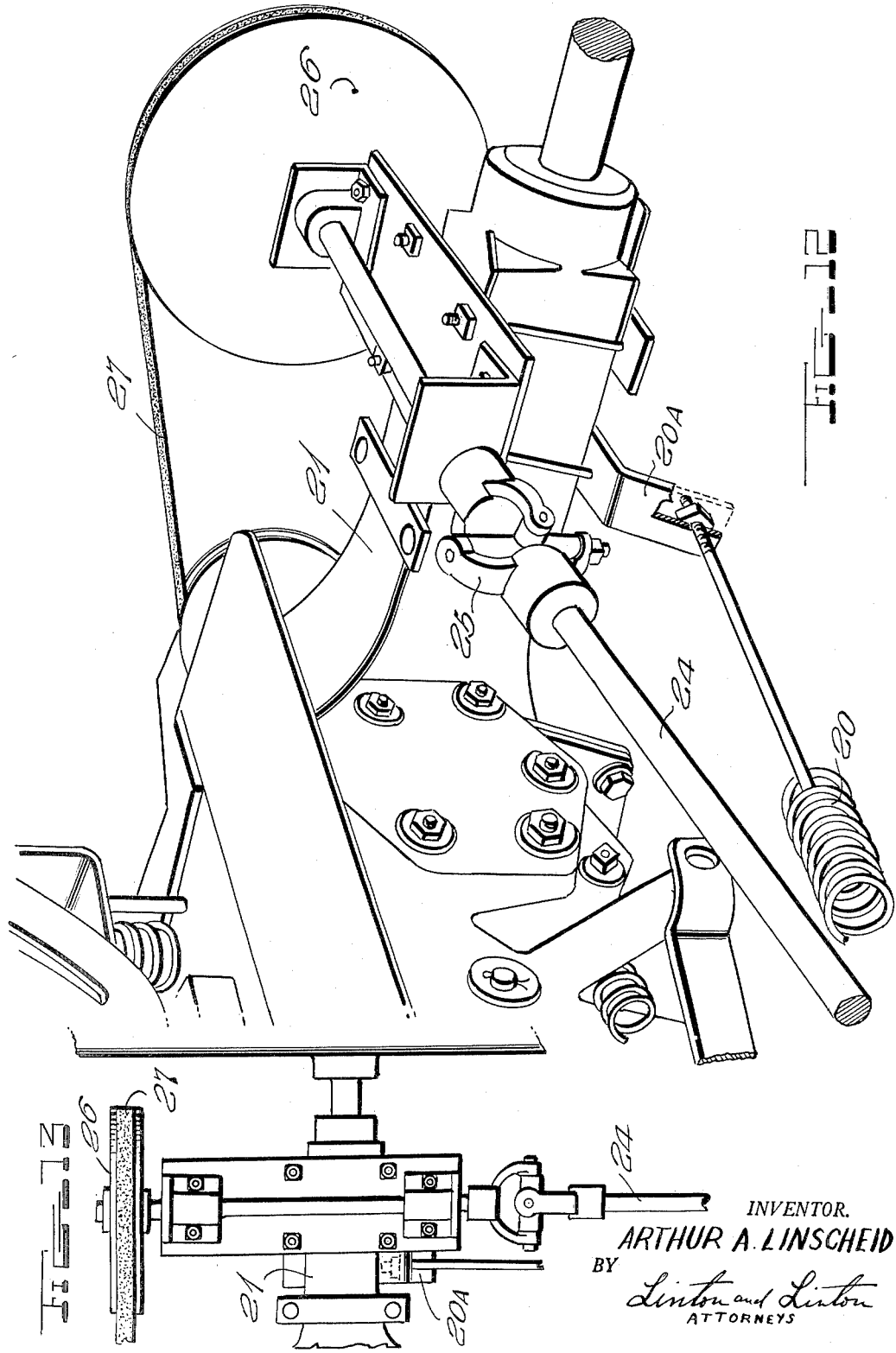

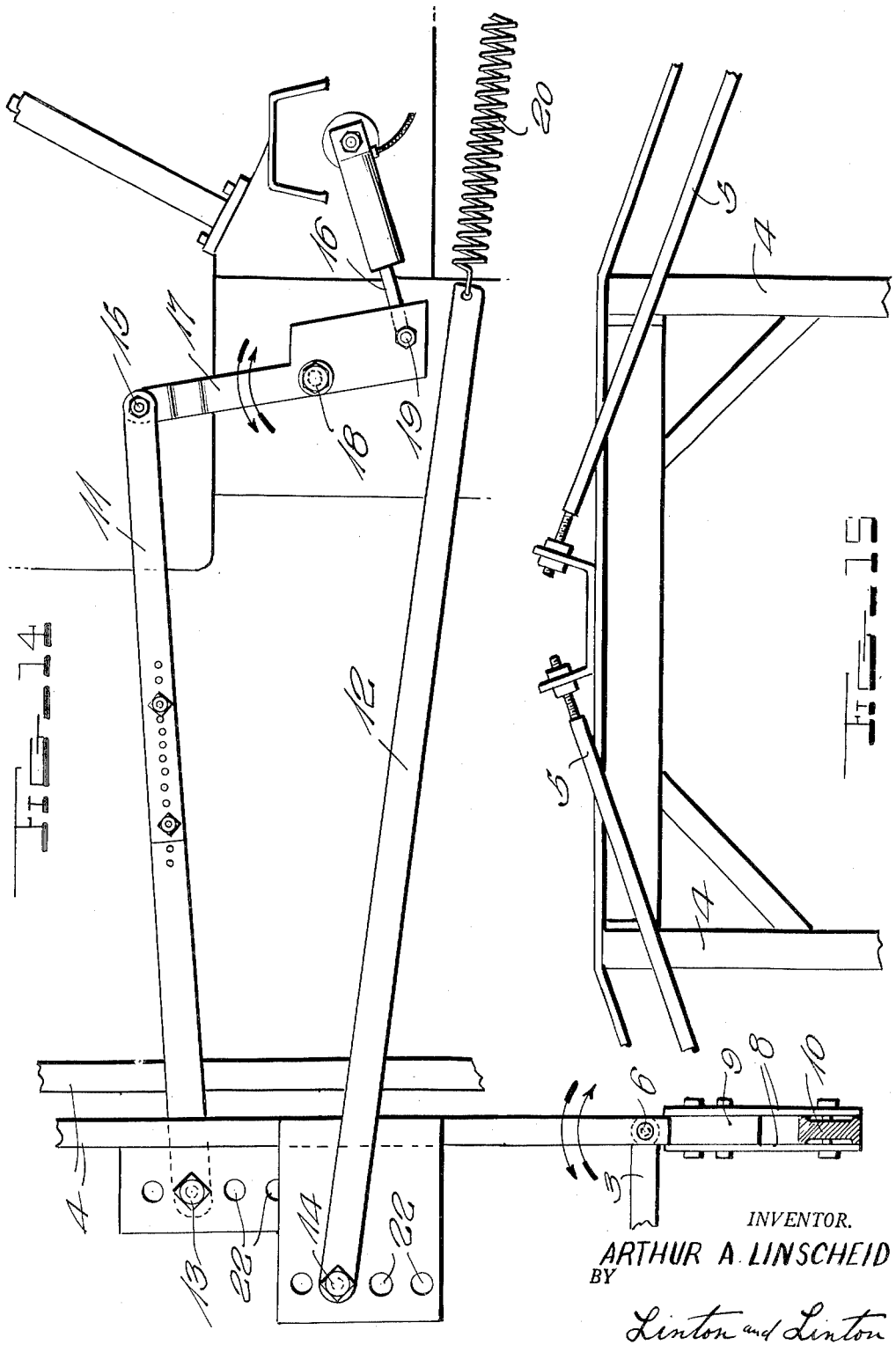

Aug. 30, 1955  A. A. LINSCHEID  2,716,319
MOWER ATTACHMENT TO TRACTOR
Filed Nov. 7, 1950  7 Sheets-Sheet 7
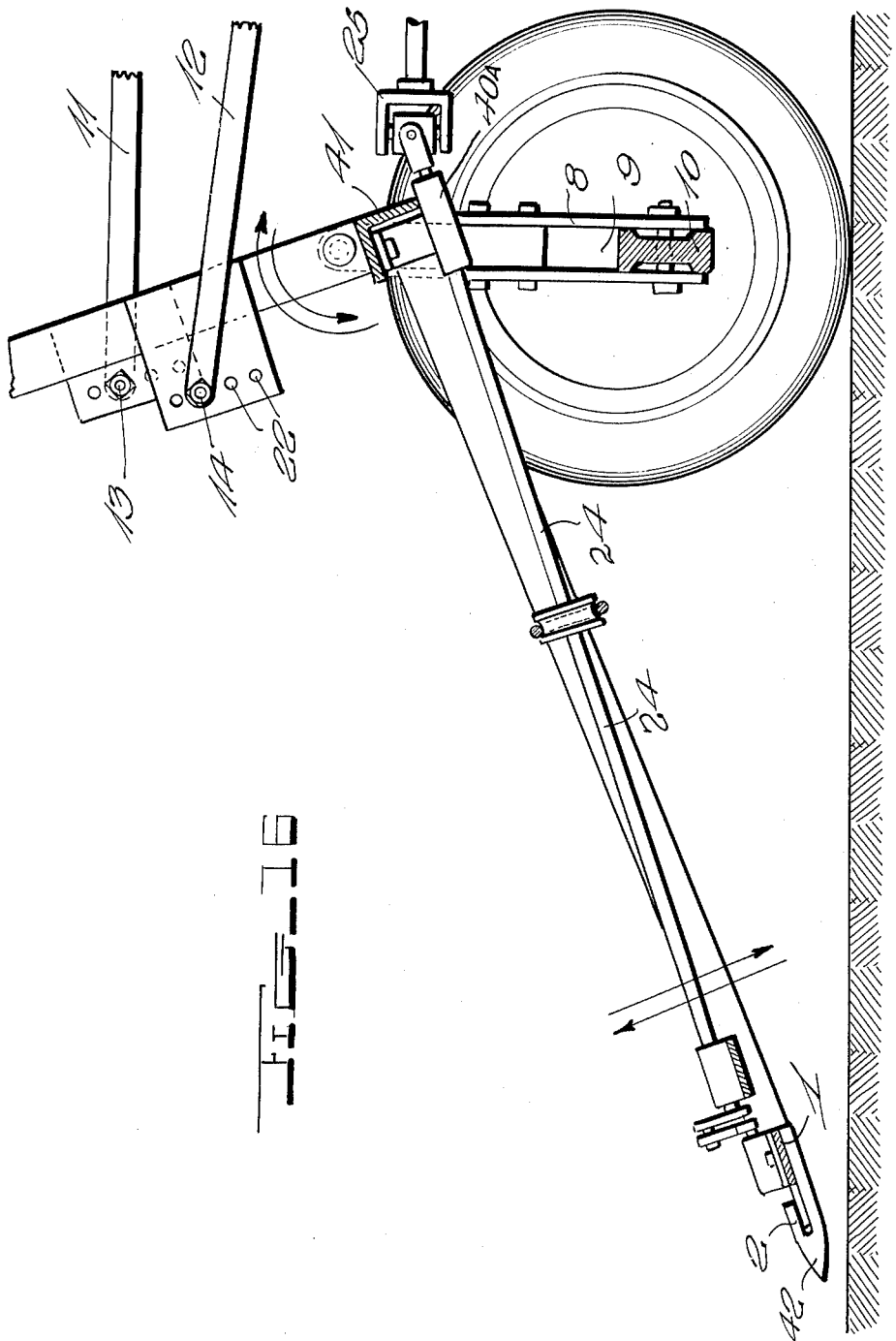
INVENTOR.
ARTHUR A. LINSCHEID
BY
Linton and Linton
ATTORNEYS

United States Patent Office 2,716,319
Patented Aug. 30, 1955

2,716,319

MOWER ATTACHMENT TO TRACTOR

Arthur A. Linscheid, American Falls, Idaho, assignor to A. A. Bennett, F. J. Orr, and Arthur A. Linscheid, copartners, doing business under the style and firm name of B&L Manufacturing Company, Boise, Idaho Application November 7, 1950, Serial No. 194,531

3 Claims. (Cl. 56—25)

The present invention relates to agricultural machinery and more particularly to a mower attachment for standard farm tractors capable of topping volunteer growth above the regular grain crop and/or cutting tall stubble to a suitable height for plowing under and the like.

An important object of the invention is to provide improved means in the form of an elongated cutter bar and associated members designed to be carried at a suitable elevation by the front axle of a standard farm tractor which cutter is operated through a flexible drive supplied with power from a rear power take off of the tractor and the elevation controlled by the hydraulic lift of said tractor whereby said cutter bar is adapted to be used for topping volunteer advanced growth that extends above the regular grain crop such as volunteer rye.

An equally important object of the invention is to provide improved means in the form of an elongated cutter bar and associated members arranged to be carried at a desired elevation and operated and controlled by connection to conventional members of said tractor whereby said cutter bar can be used for cutting tall stubble as required for plowing under or removal of said stubble.

A further object of the invention is to provide improved means for carrying an elongated cutter bar and associated members at adjustable elevations and a suitable distance in front of a standard farm tractor by light strong trusses combined into a suitable frame supported on pivots securable to the front axle of said tractor in such a manner as to employ the conventional hydraulic lift of the tractor combined with auxiliary spring counter balancing means attached to the rear axle of said tractor for adjusting and retaining said cutter bar at a desired elevation.

Another object of the invention is to provide improved means for carrying an elongated cutter bar at a suitable distance in front of a standard farm tractor and employing a frame formed to avoid clogging of the cut material between said cutter bar and the front axle of the tractor.

A still further object of the invention is to provide improved means for carrying an elongated cutter bar and a cutting reel thereabove by a frame pivotally attached to the front axle of a standard farm tractor in a manner to prevent undue strain upon said frame and associated parts during adjustment and operation of said cutter bar and reel.

Further objects of the invention will be partly pointed out and partly obvious from the following description of the invention.

In the accompanying drawings are shown the novel features and construction of a device according to the present invention:

Fig. 1 is a side perspective view of the present mower mounted upon a standard farm tractor;

Fig. 2 is a rear elevation of Fig. 1;

Fig. 3 is an enlarged side perspective view of the mower;

Fig. 4 is a plan view of the drive for the cutter bar;

Fig. 5 is an enlarged elevational view of one end of the reel showing the adjustable support therefor;

Fig. 6 is an enlarged detailed view of the adjustable mounting for cutting reel drive pulleys;

Fig. 7 is an enlarged top detailed view of the pitman rod for driving the cutter bar;

Fig. 8 is an enlarged detailed view of the pivotal mount of the cutter frame upon the tractor axle taken from the right hand side of the tractor;

Fig. 9 is an enlarged partial view showing the cutter bar drive taken from the front of the device;

Fig. 10 is a front elevation of one side of the cutting reel, drive and support;

Fig. 11 is an enlarged detailed view showing the attachment of the compensating spring to the rear axle of the tractor;

Fig. 12 is an enlarged perspective view of the power take-off for the cutting bar drive shaft at the rear of a standard tractor with parts broken away and shown in section;

Fig. 13 is a plan view of the power take-off attachment for the cutter bar drive;

Fig. 14 is an enlarged side elevation of the frame pivoting support and operating members;

Fig. 15 is an enlarged front elevation of the top central portion of the supporting frame; and Fig. 16 is a modified form of the drive for the cutter bar with parts broken away and shown in section.

In the following description corresponding reference characters are employed to designate similar members of the device.

In the embodiment of the invention disclosed reference character 1 indicates an elongated cutter bar in which reciprocates a sickle bar 2. Said cutter bar 1 is supported at the front end of a frame formed by a series of horizontally extending bars 3 forming a flat rectangular support with a series of vertically extending bars 4 connected at their tops by cross bar 4' and at their bottom end to the rear end of said bars 3 with angular truss rods 5 connected to the top of said bars 4 and to the cutter end portion of the bars 3 to form a light strong carrying frame for said cutter bar 1 and its associated members.

As best shown in Figs. 8 and 14 of the drawings, bars 3 and 4 of said frame can be pivotally mounted upon the front axle of a standard tractor by means of a stub-axle 3' extending through bearing 6 from which extend a pair of plates 8 attached to and spaced apart by a block 9 forming part of said bearing 6 and which plates can be attached to the front axle 10 of said tractor by bolts 8' passing therethrough and through openings 7 in said axle. As indicated by the drawings, there is a pivotal attachment upon both the left and right side of the frame and axle.

To control the pivotal movement of said frame a pair of bars 11 extend one on each side of said tractor as do a second pair of tension bars 12. Said bars 11 are each pivotally attached to one of the vertical trusses 4 by a bolt 13. Similarly, the bars 12 are each pivotally attached to uprights 4 by bolts 14.

Bar 11, which as shown in Fig. 14 is made in two parts each having a series of holes through which bolts can be passed for shortening or lengthening the same, is also attached at its opposite end by bolt 15 to a lever 17. Lever 17 is in turn pivoted midway of its length upon a bolt 18 which is a part of the tractor with the opposite end of said lever being pivotally attached by a bolt 19 to the piston rod 16 of the usual hydraulic lift which is a part of the general farm tractor. Piston rod 16 is thereby controlled by the hydraulic lift for pivoting lever 17 in the direction of the arrows whereupon said lever 17 in turn reciprocates bar 11 for raising and lowering the cutter frame as desired.

In order to assist the hydraulic lift in this operation, the bar 12 is attached to a tension coil spring 20 whose opposite end is fastened by means of a clamp 20A to the rear axle 21 of the tractor for providing a counterbalance to the frame tending to raise the same.

The length of the leverage between bolts 14 and bearing 6 decreases as tension of said spring 20 increases and by positioning the bolts 14 in any of the holes 22 said tension increase can thereby be compensated. Further, springs 20 provide a limited shock absorption that reduces the strain upon the cutter frame.

Sickle bar 2 is reciprocated by a pitman rod 23 which in turn is driven by its connection to a flexible drive shaft 24 provided with suitable universal joints in the length thereof and a drive pulley 26 mounted upon said rear axle 21 for receiving power from the conventional rear power take-off means of the tractor by means of belt 27, see Figs. 12 and 13.

An elongated reel 28 is positioned laterally of the tractor and longitudinally above the cutter bar 2 and is rotated by a pulley 31 attached to the axle 32 of said reel. Said axle 32 is supported at each end by one of a pair of bearing plates 30 each adjustably mounted on one of a pair of angular bars 36 by placing the bolts 30' in any of the holes 29 in said bars 36, as shown in Fig. 5, whereby the position of the reel 28 can be varied. Said pulley 31 is driven by an endless belt 33 that extends around a pair of pulleys 34 and 34A to a pulley 35 fixedly mounted on the drive shaft 24. The cutting reel and its associated members are supported by a pair of reel frames consisting of a pair of anglular bars 36 each fastened at one end to the rear of bars 3 and supported at the opposite end by a pair of vertically extending supports 37 shown in Fig. 3 but omitted from Fig. 1 to permit the showing of further structure, which in turn are fastened to the cutter end of bars 3. Said angular bars 36 each has a series of holes 38 formed therein whereby the position of the axle plate 39 can be adjustably positioned by placing the bolts 39' in any of said openings 38 for varying the position of pulleys 34 and 34A.

In the principal form of the invention drive shaft 24 is supported upon the rear of the bars 3 in a bearing 40 mounted on the top of said bars. In Fig. 16, there is shown a modified support for the drive shaft 24 which consists of a bearing 40A fastened to an extension plate 41 fastened to the top of a bar 3 whereby said bearing is positioned beneath the frame. This modified arrangement permits the cutter bar 1 to be set close to the ground without the points of the guides 42 on said cutter bar tending to dig into the ground as bearing 40A reduces the angle between the segments of said flexible drive shaft 24 with shaft 24 extending on an angle relative to bars 3 instead of parallel thereto as in Fig. 3.

By attaching plates 8 to the front axle of the tractor, the cutter frame is pivotally attached theerto. Drive shaft 24 then being coupled to the power take-off of the tractor by the belt 27 and levers 17 being pivotally attached by bolts 18 and 19 to the tractor and hydraulic lift with clamps 20A fastened to the rear axle 21 of the tractor, the cutter frame is thereby operatively connected to the tractor. The operator can thereafter proceed to employ a cutter entirely through the conventional controls of the tractor. That is by operating the controls for the hydraulic lift, the cutters are raised or lowered as desired and by operating the power take-off, the drive shaft 24, sickle cutters 22 and reel 28 are caused to function.

The bars 3 being widely spaced apart readily permits the cut material to drop on to the ground without its clogging thereof between the cutter and the tractor.

The present device is capable of considerable modifications and such changes thereto as come within the scope of the appended claims is deemed to be a part of the invention.

I claim:

1. A mower attachment for being detachably mounted on the front axle of farm tractors having a hydraulic lift and a power take-off arrangement comprising a substantially flat frame having elongated front and rear sides, a pair of axles provided in the rear side of said frame, a pair of bearings each having one of said axles rotatably mounted therethrough, means for being detachably connected to and above the front axle of the tractor and connected to said bearings for supporting the same, a plurality of bars mounted at their bottom end on said rear side of said frame with said bars extending substantially vertically above said frame, supporting rods connecting the front portion of said frame to the top ends of said bars, a pair of reel supporting frames mounted solely on and extending above said first-mentioned frame, a cutter bar mounted on the front edge of said first-mentioned frame, means mounted on said first mentioned frame for operating said cutter bar and capable of being operatively connected to said tractor power take-off, a reel rotatably supported between said reel supporting frames, means for rotating said reel being mounted on one of said reel supporting frames and being operatively connected to said cutter bar operating means, and a plurality of control bars each pivotally connected to a medial portion of one of said vertically extending bars and capable of being connected to said tractor hydraulic lift whereby said mower attachment can be pivoted on said bearing thereby.

2. A mower attachment for being detachably mounted on the front axle of farm tractors having a hydraulic lift and a power take-off arrangement comprising a substantially flat frame having elongated front and rear sides, a pair of axles provided in the rear side of said frame, a pair of bearings each having one of said axles rotatably mounted therethrough, a plurality of means for being detachably mounted on and above the front axle of the tractor and each means being connected to one of said bearings for supporting the same, a pair of bars having one end mounted on the rear side of said frame each adjacent one of said bearings and extending substantially perpendicular above said frame, a cross bar connecting the upper ends of said pair of bars, a plurality of rods connecting said cross bar to the front end portions of said frame, a cutter bar mounted on the front side of said frame, means mounted on said frame for operatively connecting said cutter bar to the power take-off of the tractor, reel supporting frames vertically mounted on said flat frame, reel shaft supporting bearings mounted on said reel supporting frames, each of said reel supporting frames having an angular bar extending from the rear side of said flat frame to said bearings, a reel rotatably mounted on said bearings, means mounted on one of said reel supporting frames operatively connecting said reel to said cutter operating means for being driven thereby and a pair of bars each pivotally connected at one end to a medial portion of one of said pairs of bars and having their opposite end capable of being attached to the hydraulic lift of the tractor.

3. A cutter bar and reel supporting frame for detachable attachment to the front axle of farm tractors having a hydraulic lift arrangement comprising a substantially flat frame having elongated front and rear sides for supporting a cutter bar on said front side, a pair of axles provided in the rear side of said frame, a pair of bearings each having one of said axles rotatably mounted therethrough, a plurality of plates with each pair thereof connected to one of said bearings, means for detachably connecting each pair of said plates to the front axle of the tractor, a pair of bars mounted on the medial portion of the rear side of said frame and extending thereabove, a bar connecting the upper ends of said pair of bars, a plurality of rods connecting said connecting bar to the front end portions of said frame, a pair of reel supporting frames mounted solely on said frame and extending above the same for rotatably supporting a reel, and a plurality of bars each pivotally connected to the medial portion of one of said pair of bars and capable of being connected to said tractor hydraulic lift whereby said mower frame can be pivoted thereby.

References Cited in the file of this patent

UNITED STATES PATENTS

| | | |
|---|---|---|
| 1,271,845 | Bryant | July 9, 1918 |
| 1,312,388 | Converse | Aug. 5, 1919 |
| 1,312,389 | Converse | Aug. 5, 1919 |
| 1,315,455 | Barby et al. | Sept. 9, 1919 |
| 1,996,294 | Hume et al. | Apr. 2, 1935 |
| 2,113,999 | Troyer | Apr. 12, 1938 |
| 2,295,091 | Meyer | Sept. 8, 1942 |
| 2,455,122 | Hansen | Nov. 30, 1948 |
| 2,485,383 | Hoyt | Oct. 18, 1949 |
| 2,487,144 | Kriedeman | Nov. 8, 1949 |